Jan. 26, 1943.  C. F. WEINREICH ET AL  2,309,424
APPARATUS FOR FREEZING ICE CREAM
Original Filed Feb. 23, 1940   5 Sheets-Sheet 1
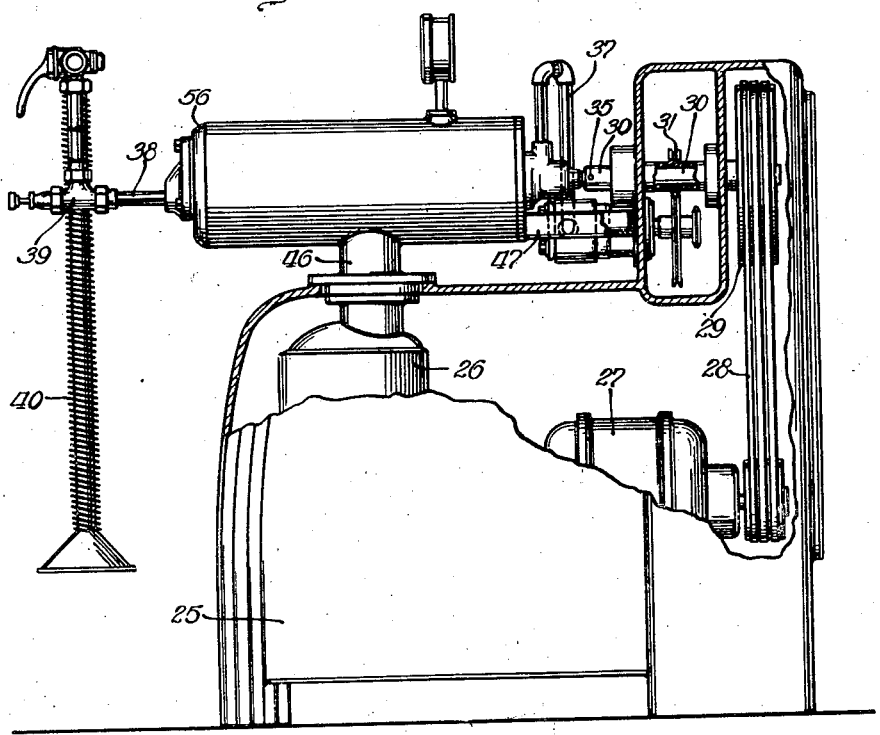
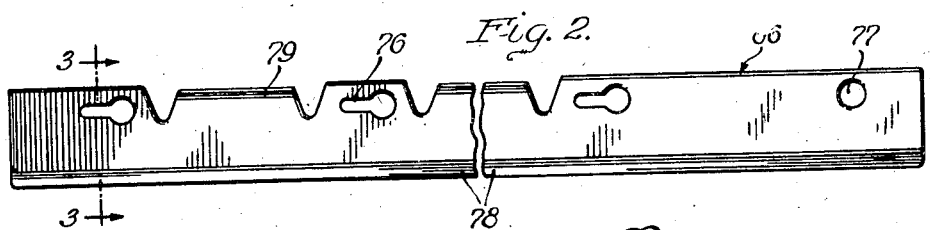
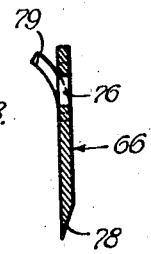
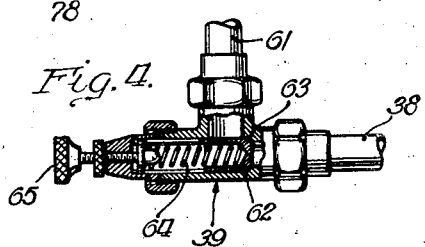
INVENTORS:
Charles F. Weinreich
Albert L. Voggenthaler
By: ATTORNEY.

Jan. 26, 1943. C. F. WEINREICH ET AL 2,309,424
APPARATUS FOR FREEZING ICE CREAM
Original Filed Feb. 23, 1940  5 Sheets-Sheet 2

INVENTORS:
Charles F. Weinreich
Albert L. Voggenthaler
By: Norman E. H. Peletzke
ATTORNEY.

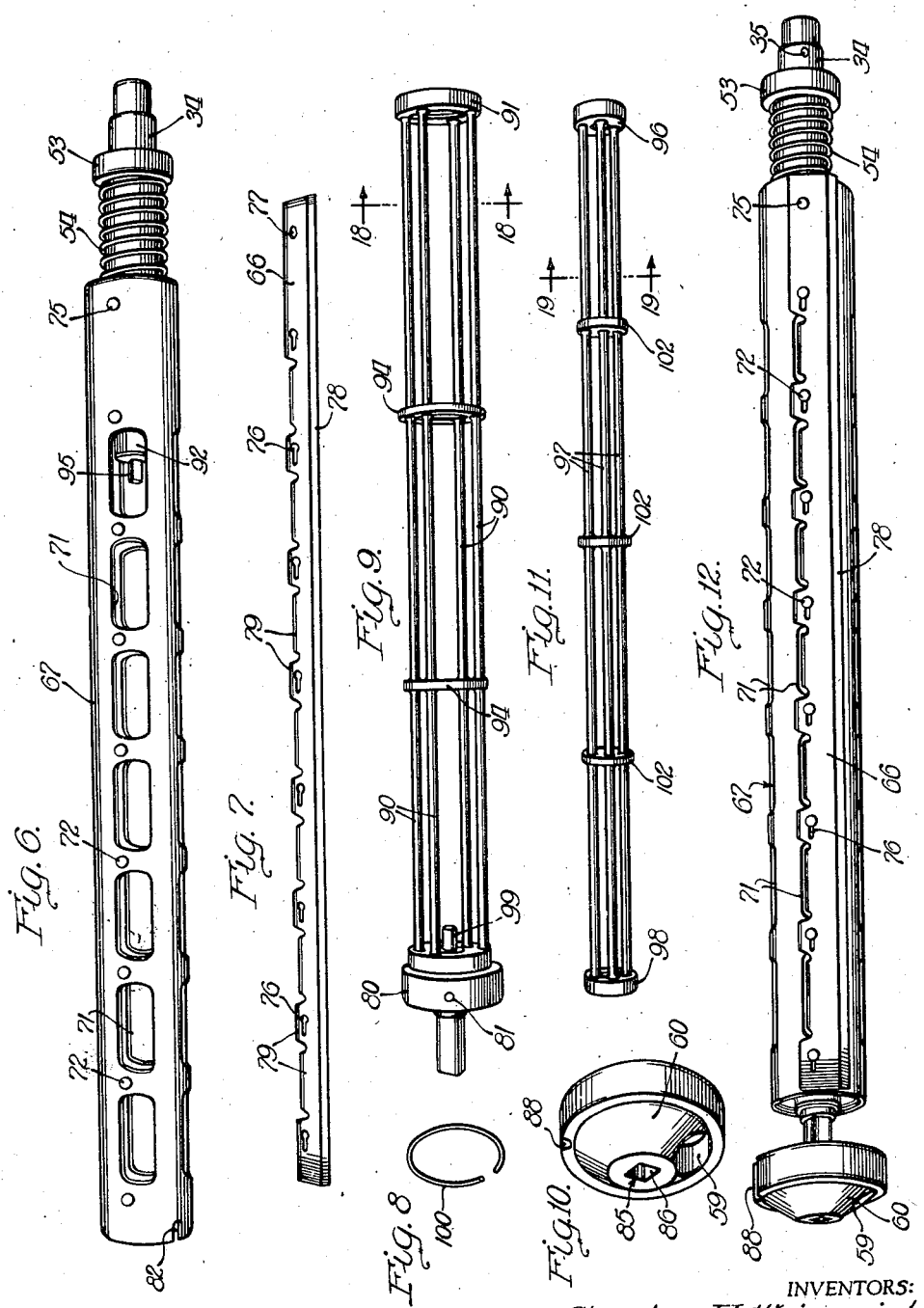

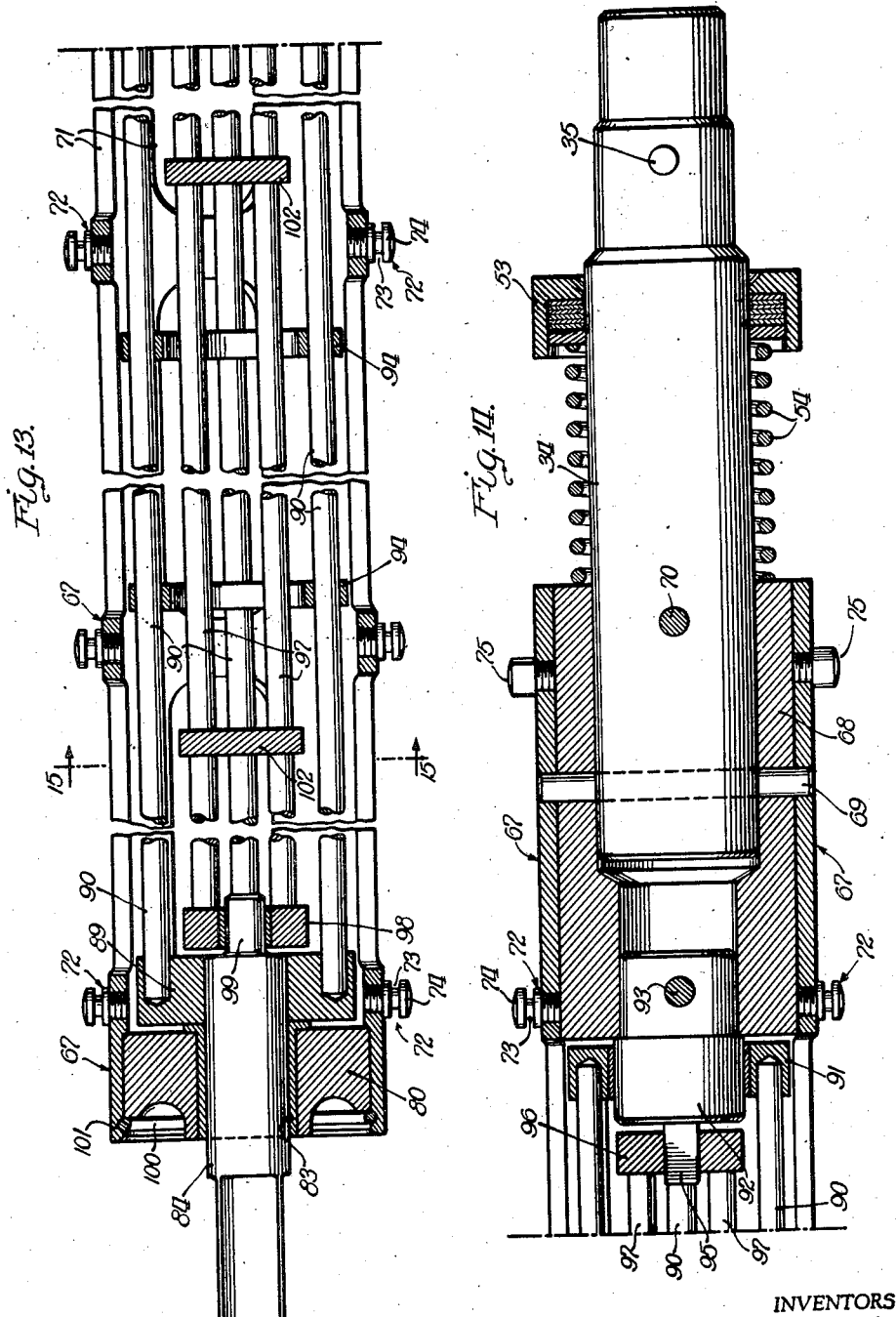

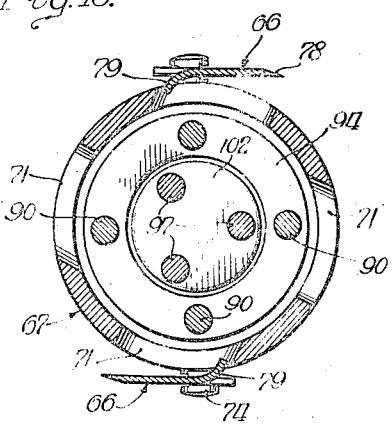
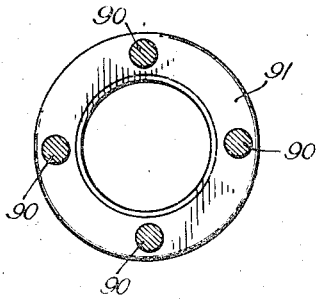
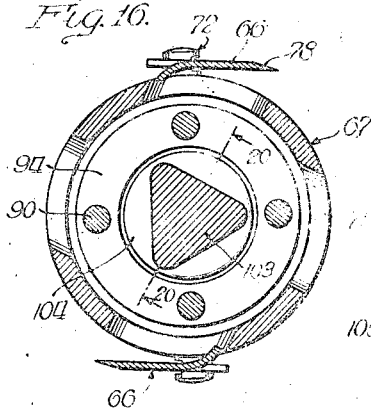
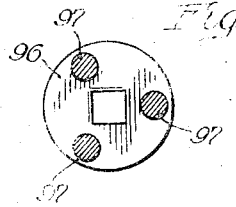
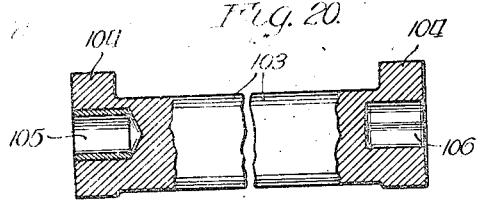
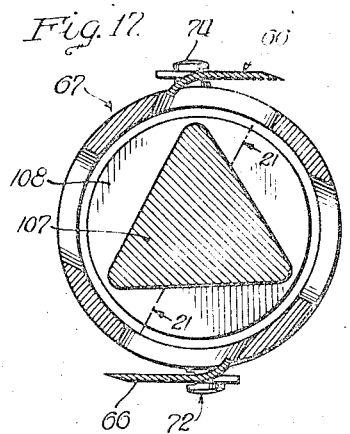
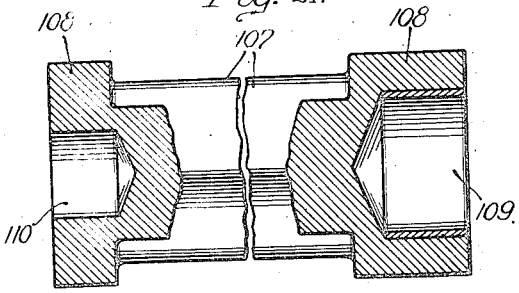

Patented Jan. 26, 1943

2,309,424

UNITED STATES PATENT OFFICE 2,309,424

APPARATUS FOR FREEZING ICE CREAM

Charles F. Weinreich, Des Plaines, Ill., and Albert L. Voggenthaler, Cedar Rapids, Iowa, assignors to Cherry-Burrell Corporation, Wilmington, Del., a corporation Original application February 23, 1940, Serial No. 320,402. Divided and this application March 9, 1940, Serial No. 323,070

18 Claims. (Cl. 259—132)

The present invention relates to an apparatus particularly adapted for use in the continuous freezing of ice cream and the like. More particularly the invention relates to agitators, scrapers, and whipping and beating mechanism for use primarily in an ice cream freezer. The invention further relates to the novel constructional features in the sanitary apparatus capable of carrying out an improved method of processing ice cream.

This application is a division of co-pending application Serial No. 320,402, filed February 23, 1940, now Patent No. 2,278,340, dated March 31, 1942.

It should, of course, be understood that the apparatus here described is intended primarily for use in the continuous manufacture of ice cream. However, the apparatus is not limited specifically to the manufacture of ice cream.

In the construction of ice cream freezers, and especially in the construction of the agitation or whipping mechanism or elements therefor, it is essential that the construction be of sanitary design to enable the sanitary handling of the perishable foodstuffs, such as ice cream, processed in the apparatus.

In many types of ice cream freezers provided with agitator or whipping mechanisms comprised of a plurality of relatively rotatable elements, separate drive shafts are usually provided for the relatively rotatable elements and these drive shafts enter the processing chamber through separate openings provided with the conventional packing boxes and seals. In the instant design of the agitator or whipping mechanism, though using a plurality of relatively rotatable elements which are readily detachable one from another only one driving element enters the freezing chamber to provide the necessary power to drive the relatively rotatable elements. In this manner it has been possible to construct a very satisfactory and sanitary ice cream freezer.

In the continuous process of manufacturing ice cream as now commonly practiced the normal liquid ice cream mix, hereinafter referred to generally as mix, is usually forced to and through a refrigerated processing chamber, together with suitable quantities of gas, such as air, which are combined with the congealed ice cream mix in finely dispersed condition during the agitating and chilling operation within the processing chamber before the ice cream is expelled from the chamber.

It has been found that in the continuous manufacture of ice cream it is very essential that the refrigeration be properly and accurately controlled and that there be sufficient refrigeration or cooling capacity to effect a rapid crystallization or congealing of the ice cream mix upon the refrigerated surface of the processing chamber.

It has also been found that the degree or extent of agitation for whipping the combined mixture of air, uncongealed ice cream mix and congealed ice cream mix to produce a homogeneous mass is a very essential and important element which must be provided for and satisfactorily performed to produce a suitable ice cream. A suitable ice cream from the consumers' as well as from the manufacturers' standpoint possesses the qualities of fine texture, and desired richness and overrun.

In some of the continuous freezers formerly used commercially, certain adjustments could be made to enable the attainment of one or more of the desired qualities in a commercially acceptable ice cream by the adjustment of the freezer to secure one or more of the necessary operating conditions to enable the production of such ice cream. However, in none of such freezers was it possible to attain all of the desirable results as to the quality of the ice cream and as to the satisfactory processing procedures thereof. It is also advantageous to be able to attain these results as to quality of ice cream and processing procedure through a reasonably wide range of critical conditions.

The combination of ingredients united to form a commercial ice cream mix normally produces a complicated chemical solution. The changes which take place in such ice cream mix during the freezing or congealing, whipping and agitating process probably are the reasons for and are probably related to the difficulties normally incurred in the processing of ice cream in a mechanism in which satisfactory provisions have not been made to secure the desired characteristics of the product as have been provided for in the apparatus constituting part of the instant invention.

An object of the present invention is to provide an agitator or scraper and whipping assemblage of simple, sanitary design in which the scraper and whipping elements are detachably secured together as a unit and are readily and easily detachable one from another, and in which the elements of the assemblage are removable and detachably retained together and in operative position within the processing chamber without the use of unsanitary mechanisms.

Another feature of this invention is to provide an agitator having a plurality of relatively movable members in which the movable members rotate in concurrent direction.

An additional important feature of this invention is the provision in an ice cream freezer of a processing chamber in which the ice cream, after being properly congealed and whipped, is further processed in a portion of the processing chamber, wherein the ice cream is not subjected to any substantial further refrigeration, to thereby permit the further completion of the crystallization process and the reaching of a state of equilibrium in the solutions comprising the ice cream mixture.

A further and more specific object of the present invention is to provide an agitator for an ice cream freezer or like device in which at least some of the agitator elements are comprised of cage-like structures, in which the elements of each cage-like structure are held together by bracing and deflecting elements staggered with respect to one another, and in which a single drive mechanism to actuate the plurality of relatively rotatable agitator elements extends out of the freezing cylinder.

These and other objects, purposes and important features of this invention will be apparent to those skilled in the art from the description of the invention and the appended claims when read in connection with the accompanying drawings in which:

Figure 1 is a general elevational view partially in broken away section showing the general arrangement of the freezing chamber, agitator drive, discharge connections and supply connections.

Figure 2 is a plan view of the improved scraping blade.

Figure 3 is a cross sectional view taken along line 3—3 of Figure 2.

Figure 4 is a view partially in broken away section of the discharge control valve.

Figure 6 is a plan view of the outer tubular agitator element which is in the form of a cage-like structure and discloses a single driving element which extends out of the freezing cylinder.

Figure 7 is a plan view of the improved scraping blade in relative position to the outer agitator element shown in Figure 6.

Figure 8 is a perspective view of the spring ring for maintaining the dasher in assembled order.

Figure 9 is a plan view of the intermediate dasher element of cage-like construction showing the bracing and baffle elements associated therewith.

Figure 10 is a perspective view of the inner displacement spider of the front cylinder head.

Figure 11 is a plan view of the inner dasher element of cage-like construction showing the bracing and baffle elements associated therewith.

Figure 12 is a perspective view of the assembled dasher and inner sectional cylinder head in relative order of assembly.

Figure 13 is a longitudinal sectional view of the front end of the assembled dasher.

Figure 14 is a longitudinal sectional view of the rear portion of the assembled dasher.

Figure 15 is a cross sectional view of the assembled dasher taken along a section generally indicated by line 15—15 of Figure 13.

Figure 16 is a cross sectional view of a modification of the dasher shown in Figure 15 in cross section in which the inner member is solid and of triangular cross section.

Figure 17 is a cross sectional view of a further modified dasher having a solid triangularly cross sectioned inner member and in which the dasher consists only of an outer and an inner member.

Figure 18 is a cross sectional view of the intermediate dasher member taken along line 18—18 of Figure 9.

Figure 19 is a cross sectional view of the inner dasher member taken along the line 19—19 of Figure 11.

Figure 20 is a cross sectional view partially in outline of the solid inner dasher element shown in Figure 16 taken along the line 20—20 of Figure 16.

Figure 21 is a cross sectional view partially in outline of the solid inner dasher element shown in Figure 17 taken along the line 21—21 of Figure 17.

Figure 5:
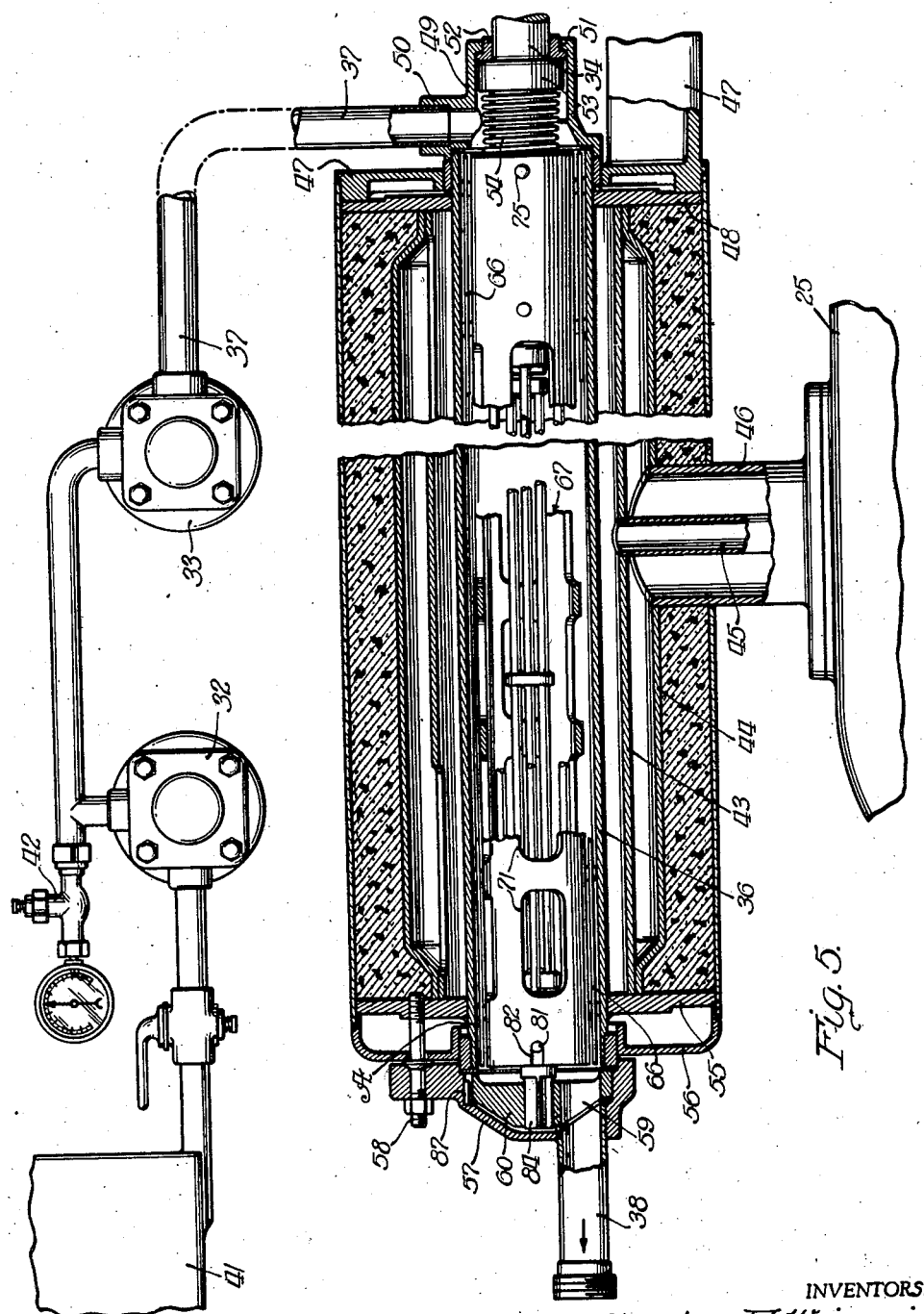
Figure 5 is a side elevational view of a freezer partially in broken away section showing the supply pumps schematically.

Referring to the illustrations showing the invention in its preferred form, like numerals being associated with like elements, 25 is a freezer base housing a refrigerant control and circulating system 26 and an agitator and pump mechanism driving unit 27. Through driving belts 28 and pulleys 29 power is supplied to the main drive shaft 30 which is fixed to a suitable pulley 31 to transmit power through any suitable arrangement of belts and pulleys to the mix pumps 32 and 33.

The front end of the drive shaft 30 is keyed by shear pin 35 to the stud shaft 34 rigidly fixed to the rear portion of the freezer agitator mechanism. The stud shaft 34 comprises the only driving means which extends out of the freezing tube and which supplies the power for driving the relatively rotatable elements of the agitator mechanism. The ice cream mix pumps 32 and 33 supply the ice cream mix as well as air or other suitable gas in metered and predetermined proportionate quantities under super-atmospheric pressure to the interior of the processing chamber or freezing tube 36 through the supply pipe 37.

The processed ice cream is discharged from the opposite end of the processing chamber 36 in a completely processed condition through the discharge conduit 38. From the discharge conduit 38 the processed ice cream passes through the discharge control valve 39 to any type of conventional can filler or package filler generally indicated by the numeral 40.

The ice cream mix, more commonly referred to as mix, is supplied to the mix pumps 32 and 33 from any suitable supply chamber generally indicated by the numeral 41. The air or other suitable gas is supplied to the conduit joining the pumps 32 and 33 through an air or gas valve generally indicated by the numeral 42. The operation of the mix pumps 32 and 33 and the air valve 42 is generally set forth in United States Patent No. 1,907,486.

The freezing chamber 36 is surrounded by concentric inter-connected refrigerant jackets 43 and 44 operatively connected with refrigerant supply and discharge passages 45 and 46, respectively. The fundamental arrangement of the refrigerant jackets and supply and discharge connections and other elements associated with the supply and accurate control of the refrigerant for use in cooling the processing chamber 36 is constructed substantially in accordance with the general arrangement as set forth in United States Patent No. 2,132,932.

It is to be noted, from an examination of Figure 5, that the refrigerant jackets 43 and 44 are not co-extensive with the length of the processing tube 36.

The entire assemblage of the freezing tube 36 and refrigerant jackets 43 and 44 is insulated and jacketed in any conventional manner. The entire arrangement of freezing tube or processing chamber 36 and associated refrigerant and insulation jackets is supported upon the base 25 by the refrigerant discharge conduit 46 and the extension of the rear gear housing 47 which is secured in any conventional manner to the rear end plate 48 of the refrigerant jacket assemblage.

The rear head 49 of the freezing or processing tube 36 is attached to the tube 36 in any conventional manner, such as by screw threads or welding, and is provided with a laterally extending opening 50 to receive the end of the mix supply line 37. The rear head 49 is also provided with an axial opening 51 concentric with the processing tube 36 and is provided with a radial end thrust bearing 52 to support the stud shaft 34 fixed to the rear portion of the ice cream freezer agitator mechanism. To seal the entrance of the shaft 34 through the bearing 52 a rotary seal generally indicated by the numeral 53 is provided. The rotary seal, when the agitator is assembled within the processing chamber, is held in sealing position against the thrust bearing 52 by a compression spring 54.

The front end of the refrigerant jacket arrangement is closed and sealed to the processing tube or chamber 36 by a front end plate 55 to which is fastened a jacket head 56 also secured to the front end of the processing tube 36 exteriorly of the refrigerant jacket. A front cylinder head 57 for the tube 36 is securely fastened in a detachable manner to the end plate 55 by any convenient arrangement, such, for example, as bolts 58. The discharge conduit 38 is fixed in an aperture in the cylinder head 57 and communicates with a discharge passage 59 in the displacement spider 60 fitted into the inner depression of the cylinder head 57.

The discharge control valve 39 is adapted to regulate the pressure within the processing chamber or freezing tube 36 by restricting the flow of the finished ice cream discharging from the processing chamber 36 through conduit 38. As the finished ice cream flows through the conduit 38 and the control valve 39 past the adjustable spring-biased valve plunger 62, it tends to move the plunger 62 away from the plunger seat 63, thereby moving the plunger 62 into a position compressing the spring 64 which normally biases the plunger 62 toward the plunger seat 63. The compression of the spring 64 is adjusted by means of the adjusting screw 65.

The general construction of the freezing or processing tube, the ice cream mix and air supply pumps and valves, refrigerant jackets enveloping the processing chamber, refrigerant supply and regulating system, motor drive connections for the agitator mechanism and pumps, as well as the discharge valve and can filler, all of which have been previously described, are all of a type now common in commercial constructions of ice cream freezers. They have been here described for the purpose of explaining the mechanism which is associated with and necessary in the operation of the improved mechanical features of the freezer dasher.

On the interior of the processing chamber 36 and extending longitudinally throughout the entire length thereof is housed a compound agitator or mutator of two or more relatively movable elements and scraping blades 66. As illustrated in Figures 2, 5 to 15, 18 and 19, the mutator or agitating mechanism is comprised of a tube-like outer element 67 somewhat less in diameter than the internal diameter of the processing tube or chamber 36 and rotatively supported concentrically within the cylinder 36.

In the rear portion of the hollow outer agitator element 67 is provided a concentric tubular element or reducing member 68 keyed to the outer agitator element 67 by keys 69 and 70 which also lock the one end of the stud driving and supporting shaft 34 into fixed central position in the outer end of the element 68. On the portion of the stud shaft 64 extending out of the element 68 is provided a rotary seal 53, its compression spring 54 and a key-way for the fracturable drive key 35 for drivingly engaging the main drive shaft of the freezer, all as previously described.

The outer tubular agitator element 67 is provided with four sets of elongated apertures 71, each set being disposed at an angle of ninety degrees to the adjacent set and each set consisting of a plurality of elongated apertures 71 longitudinally arranged in end-to-end alinement extending substantially throughout the entire length of the agitator element 67.

The ice cream mix pumped to and through the processing chamber 36 by the mix pumps 32 and 33 tends to congeal and adhere to the refrigerated surface of the processing chamber as it passes along the passage formed between the outer periphery of parts of the outer agitator element 67 and the inner periphery of the tubular processing chamber 36. To maintain this free of congealed ice cream, two diametrically oppositely disposed scraping blades 66 are provided to scrape the congealed mix from the refrigerated inner surface of the processing chamber. The scraping blades 66 are supported on the outer rotary agitator element 67 by two longitudinally extending diametrically opposed rows of blade supporting studs 72 projecting outwardly from the outer agitator element 67. Each row of studs 72 is arranged in substantial alinement with the rear edge of a row of elongated apertures 71 in the element 67.

The studs 72 may be secured to the outer rotary element 67 in any desired manner. Each stud 72 has a reduced neck 73 and a head 74. At the one end of the outer agitator element 67 there are additional locking studs 75 having a cylindrical outer end alined with the studs 72. The scraping blades 66 are provided with keyhole openings 76 for the studs 72 and a circular opening 77 for the studs 75. All of these openings are arranged in alinement lengthwise of the blades and they are offset from the opposite side of the longitudinal center line of the blades from the scraping edge 78.

The rear edge of each scraping blade 66 is provided with serrations 79, every other one of which is inclined at an angle to the plane of the blade 66 and extends from the blade toward the outer tubular agitator element 67 when the blade is mounted therein in operative position. When so mounted the blade 66 substantially overlies a row of apertures 71 in the wall of the tubular outer agitator element 67.

The scraping edge 78 of the blade 66, when mounted in operative position, is substantially above the front edge of the apertures 71 but slightly removed therefrom while the ends of the inclined serrations 79 at the rear edge of the blade 66 are just inside of the apertures 71 adjacent the rear edges thereof. Obviously the inclined serrations 79 will guide and direct the congealed ice cream mixture scraped from the refrigerated wall of the chamber 36 into the hollow interior of the outer agitator element 67 through the apertures 71 immediately below the blade 66. The ice cream mix so directed into the hollow interior of the outer agitator element 67, after being thoroughly whipped while therein by whipping members imprisoned therein as hereinafter described, passes out from the interior of the outer agitator element 67 through the two remaining sets or rows of longitudinal apertures 71 preferably disposed at an angle of ninety degrees to the row of apertures 71 immediately below the scraping blades.

To mount a scraping blade in position on the outer agitator element 67, the round part of the keyhole openings 76 is engaged with the heads 74 of the studs 72 and then the blade is moved lengthwise to engage the elongated parts of the keyhole openings with the necks 73 of the studs 72. The openings 77 are then engaged with the outer ends of the studs 75 which hold the blade in locked position on the studs 75 with the elongated parts of the keyhole openings engaged with the necks and beneath the heads of the studs 72. Obviously to enable such a mounting of the scraping blades 66 it is necessary that they be flexible to permit the essential bending incidental to such manipulation of the scraping blades.

The necks 73 of the studs are slightly smaller than the elongated parts of the keyhole openings 76 and they are longer than the thickness of the blade 66 so that, when the blade is securely locked on the studs, it is loosely retained and is capable of rocking transversely, that is to say, it is capable of movement both radially and tangentially of the rotatable agitator body 67. Since the keyhole openings in the blade are closer to the rear edge thereof than to the scraping edge 78 thereof, the greater part of the width of the blade is located in front of the studs and above the apertures 71 in the outer agitator element 67.

The pressure of the congealed material scraped from the inner periphery of the processing chamber 36 against the under side of the scraping blade in front of the studs in conjunction with the centrifugal force when the agitator is rotating holds the scraping edge 78 of the blade in close contact with the refrigerated wall of the freezing chamber and in substantial tangential relation therewith. The scraping blade is preferably made of thin non-corrosive material, such as stainless steel, and is sufficiently flexible longitudinally and transversely to permit it to be easily mounted on or removed from the outer agitator element.

The front or head end of the outer agitator element 67 is supported for rotation upon a centrally apertured solid spider element 80 telescopically fitted into the front end of the outer agitator element 67 and keyed thereto by a lug 81 on the outer periphery of the spider 80 which engages the slot 82 in the end of the tubular element 67. The spider 80 is swiveled for rotation on the thrust bearing 83 carried by the front stud shaft 84 which at its front free end is splined to and supported in a central aperture 85 having clutching faces 86 in the front displacement spider 60.

The front displacement spider 60 is provided at its lower side with the discharge aperture 59 alined with the discharge aperture in the dished front cylinder head 57 into which dished portion the displacement spider is closely fitted and supported co-axially with the processing chamber 36. The displacement spider 60 is prevented from rotating by a key 87 in the front cylinder head 57 which engages a key-way 88 in the outer periphery of the displacement spider 60.

The inner end of the stud shaft 84 is rigidly fixed to the front spider 89 of the intermediate whipping or agitating element which is imprisoned within the outer agitator element 67 by the removable bearing and closure element 80 and which intermediate whipping element is comprised of a series of longitudinally extending beating rods 90 which are arranged in a cage-like construction. The beating rods 90 are arranged in a circular formation of uniform radial extent from the central axis of the processing chamber 36 which is also the axis of the agitating mechanism and are positioned slightly within the inner periphery of the agitating element 67. The opposite ends of the beating rods 90 of the intermediate agitator element are fixed to an annular rear spider 91 mounted for relative rotation upon a central inwardly extending pivot 92 keyed to the inner end of the centrally apertured member 68 by key 93. Intermediate their ends the rods 90 of the stationary intermediate element are braced by annular bracing spiders 94 which also comprise deflector or baffle elements.

The inner reduced central portion 95 of the rear internal pivot 92 is splined to a rear spider 96 of the internal whipping or agitating element to support and rotate the same concurrently with the rotation of the outer dasher element 67 to which the pivot 92 is operatively connected. The inner whipping or agitating element is imprisoned within the intermediate agitator element and also imprisoned within the outer agitator element and rotates in the same direction as does the outer agitator element, both rotating relative to the intermediate whipping or agitating element.

The inner agitator element is composed of longitudinally extending beating rods 97 radially disposed in a cage-like or triangular formation from the central axis of the processing chamber 36 and within the intermediate agitating element. The front end of the beating rods 97 of the internal agitating element are fixed or mounted in an annular spider 98 rotatively supported on a central pintle 99 on the inner end of the front stud shaft 94. Intermediate their ends the inner whipping rods 97 are braced at intervals by disk-like spider elements 102 which also comprise deflector or baffle elements.

The lengths of the various agitator elements, i. e., the hollow agitator element, the intermediate stationary agitator element and the internal rotary agitator element, are such that, when assembled in order as shown in Figures 13 and 14, the stud shafts 84 and 34 and the associated elements of the agitator mechanism are positioned in spaced axial alinement so as to permit the free rotation one within another of the relatively rotatable elements. To prevent the separation of the elements when assembled as shown, a lock ring 100 is engaged in a complementary annular groove 101 on the outer agitator element 67. The lock ring 100 prevents the outward movement of the spider 80 which is swiveled on the bearing 83 carried by the front stud shaft 84 and which is prevented from moving inwardly by abutting against the front spider 89 of the intermediate whipping element which is permanently fixed to the inner end of the front stud shaft 84. The intermediate whipping element is prevented from inward longitudinal motion by the engagement of the rear spider 91 thereof with the element 68 in the outer agitator element 67. In this manner longitudinal motion of the intermediate agitator element in either direction and, therefore, also longitudinal motion of the inner agitator element in either direction is prevented.

To disassemble the hollow mutator or multi-sectioned agitator element it is only necessary to remove the clip ring 100 and withdraw the intermediate and inner agitator elements from the outer agitator element. The disassembly of the agitator mechanism is then completed by withdrawing the inner agitator element from the intermediate agitator element and removal of the scraping blades from the outer tubular agitator element 67. It is to be noted that, with the exception of the scraping blades, the various relatively rotatable elements of the entire dasher or agitator assembly are locked in operative position with respect to one another by the single clip ring 100, thereby providing a very sanitary and simple agitator construction easy to disassemble and, when disassembled, easy to clean. To assemble the dasher or agitator mechanism the reverse procedure of that set forth above may be followed.

To mount the agitator for operation within the processing chamber it is inserted thereinto a sufficient distance so that the stud shaft 34 may be keyed to the main drive shaft 30, as indicated in the figures. The front displacement spider 60 is then placed in the front cylinder head 57 with the key 87 engaged in the key-way 88 and the assembled cylinder head 57 and displacement spider 60 are then placed in position over the open head end of the processing chamber 36 with the free end of the front supporting shaft 84 splined to the displacement spider 60.

To secure the cylinder head 57 in place the retaining bolts 58 are then tightened to seal the processing chamber. When so assembled, the outer and inner agitator elements, upon the rotation of the main drive shaft 30, will rotate together in the same direction while the intermediate agitator element will remain stationary due to the fact that it is splined to the stationary displacement spider 60.

This arrangement of outer, intermediate and inner agitator elements comprised primarily of the outer agitator element 67 and the beating rods 96 and 97, together with the processing cylinder 36, produces an agitating chamber in which three sets of elements move relatively with respect to one another when the freezer is in operation. Into and through this agitating chamber the congealed mixture scraped from the refrigerated inner periphery of the processing chamber or cylinder 36 is directed by the inclined serrated portions of the rear edges of the scraping blades to be agitated and blended therein to produce a homogeneous mass.

In Figures 16 and 20 are shown views of modifications of an agitator mechanism in which the inner agitator element is comprised of a solid triangular element 103 provided with end spiders 104 having a central socket 105 in the front spider and a socket 106 in the rear spider for supporting and engaging the reduced portion 95 of the rear pivot 92 in splined relation therewith while the front socket 105 rotatably engages the front pintle 99.

In Figures 17 and 21 are shown views of a further modified agitator element in which only one whipping element is provided on the interior of the outer tubular element 67. In this modification the single internal element 107 is of triangular cross section provided with end spiders 108. The rear end spider 108 is provided with a socket 109 to rotatably engage the rear pivot 92 while the front spider 108 is provided with a socket 110 to engage the inner end of the front stud shaft 84 in a pressed fit so that the inner element 107 will be held in non-rotative relation relative to the processing chamber.

By the novel and unique improvement in a dasher primarily adapted for use in a continuous freezer, as heretofore described, this invention provides a sanitary, highly efficient agitator or whipping and beating mechanism for use primarily in an ice cream freezer of the type referred to herein. The improved agitator also comprises a mechanism which is readily demountable and assemblable which greatly facilitates the cleaning of the apparatus.

The agitator, as specifically disclosed, provides a means in which a certain portion of the beating and whipping operation can be carried on substantially within the confines of the outer agitator or carrier element. The particular construction as shown comprises a device in which the various elements are proportioned and related one to another in such a manner as to secure a highly efficient type of agitation and in which the material being processed as it flows through the processing cylinder of the ice cream freezer is forced to follow a course during which it is repeatedly subjected to the action of each of the different agitator elements. The agitator mechanism is particularly designed to prevent the formation or accumulation of large quantities of solid material within the agitator element which would tend to prevent the normal operation of the whippers and beaters of the agitator and would also tend to prevent the proper normal circulation of the material being processed through the same.

The foregoing detailed description of the apparatus and process has been given for clearness of understanding only and no unnecessary limitations shall be understood therefrom. Various changes in the arrangement of the numerous elements of the apparatus, as well as in the steps of the process, as described to explain the invention, may be made in accordance with the common knowledge of those skilled in the art and yet come within the scope of the invention as set forth in the appended claims.

The invention is hereby claimed as follows:

1. A whipping, beating and scraping mechanism for an ice cream freezer comprising, in combination, a rotatable rigid outer supporting body, an inner whipping and beating element, an intermediate whipping and beating element, scraping blades removably carried by said supporting body, and bracing and deflecting means on said inner and intermediate whipping and beating elements, said bracing and deflecting means on one of said whipping and beating elements being staggered with respect to said bracing and deflecting means on said other element, whereby the flow of material longitudinally of said whipping and beating elements is caused to pass from one element into the other.

2. An agitator mechanism for operation in a processing cylinder of an ice cream freezer having a removable front cylinder head comprising, in combination, an outer rotatable tubular agitator element having an aperture in the wall thereof, means for supporting a scraping blade on the outer surface of said tubular element, a scraping blade removably supported on said supporting means, means on said scraping blade disposed at an angle to the plane of said blade and directed toward said aperture, a first stud shaft fixed to the rear portion of said tubular element for supporting and driving the same, a stationary inner agitating and beating element rotatively supported at its adjacent end by a pivot in the rear portion of said tubular element, a second stud shaft at the front portion of said inner element for rigidly and non-rotatively supporting the same, an annular bearing element keyed to the front end of said tubular element and rotatively mounted upon said second stud shaft for supporting the front end of said tubular element, and a displacement and supporting spider adjacent the front end of said outer and intermediate agitator elements and said front cylinder head, said displacement spider being keyed to the front end of said processing cylinder and to said second stud shaft and being of such other dimensions as to completely occupy the space intermediate the front cylinder head and the front end of the agitator assemblage.

3. An agitator mechanism for operation in a processing cylinder of an ice cream freezer having a removable front cylinder head comprising, in combination, an outer rotatable tubular agitator element having an aperture in the wall thereof, means for supporting a scraping blade on the outer surface of said tubular element, a scraping blade removably supported on said supporting means, means on said scraping blade disposed at an angle to the plane of said blade and directed toward said aperture, a first stud shaft fixed to the rear portion of said tubular element for supporting and driving the same, a stationary intermediate agitating and beating element rotatively supported at its adjacent end by a pivot in the rear portion of said tubular element, a second stud shaft at the front portion of said intermediate element for rigidly and non-rotatively supporting the same, an annular bearing element keyed to the front end of said tubular element and rotatively mounted upon said second stud shaft for supporting the front end of said tubular element, an inner agitating and beating element rotatively supported at its front end by a pintle on the inner end of said second stud shaft and splined at its rear portion to an inner extension of said first stud shaft at the rear portion of said tubular element, and a displacement and supporting spider adjacent the front end of said outer and intermediate agitator elements and said front cylinder head, said displacement spider being keyed to the front end of said processing cylinder and to said second stud shaft and being of such other dimensions as to completely occupy the space intermediate the front cylinder head and the front end of the intermediate and outer agitator elements.

4. A dasher for an ice cream freezer having a cylindrical processing chamber comprising, in combination, a longitudinally extending outer tubular element having an apertured wall, means for supporting a scraping blade on the outer surface of said tubular element, a scraping blade removably supported on said supporting means, means on said scraping blade disposed at an angle to the plane of said blade and directed toward said aperture, a first stud shaft fixed to the rear portion of said tubular element for supporting and driving the same, a stationary intermediate agitating and beating element rotatively supported at its adjacent end by a pivot in the rear portion of said tubular element, a second stud shaft at the front portion of said intermediate element for rigidly and non-rotatively supporting the same, an annular bearing element keyed to the front end of said tubular element and rotatively mounted upon said second stud shaft for supporting the front end of said tubular element, an inner agitating and beating element rotatively supported at its front end by a pintle on the inner end of said second stud shaft and splined at its rear portion to an inner extension of said first stud shaft at the rear portion of said tubular element, and a displacement and supporting spider adjacent the front end of said outer and intermediate agitator elements and said front cylinder head, said displacement spider being keyed to the front end of said processing cylinder and to said second stud shaft and being of such other dimensions as to completely occupy the space intermediate the front cylinder head and the front end of the intermediate and outer agitator elements.

5. The combination of a carrier element for a rotatable agitator device forming a substantially enclosed space, and a scraper blade tiltably carried upon said carrier element, said blade comprising a flat portion and an angularly disposed, inwardly directed following portion extending through the major portion of the length of said blade, and said carrier element being apertured to permit material to pass from below said blade into and through said carrier element.

6. A scraping device of the class described comprising a substantially flat metal blade, blade supporting and attaching means in the rear portion of the blade, and rearwardly extending portions of the blade intermediate the attaching means and between serrations, said portions extending from the blade at an angle to the plane of said substantially flat blade.

7. In a device of the class described, a carrier element, a scraper blade comprising a flat portion and following portions angularly disposed to the flat portion, and separate means to support said blade upon said carrier intermediate said angularly disposed following portions.

8. An agitator for an ice cream freezer comprising inner, outer and intermediate separable agitator members, a driving shaft and supporting element for the rear portion of said outer member, means supporting the front end of said intermediate member within said outer member, bearing means supporting the front end of said outer member upon said intermediate member, means for rotatably supporting the rear portion of said intermediate member within said outer member, means keyed to and supporting the rear portion of said inner member within the adjacent end of said outer member, means for rotatably supporting the front end of said inner member within said intermediate member, and readily detachable retaining means engaging said bearing means supporting the front end of said outer member in operative position on said intermediate member whereby, upon detaching said retaining means, said intermediate member and said inner member may be removed from said outer member and said inner member removed from said intermediate member.

9. In an agitator for an ice cream freezer having a horizontally arranged freezing cylinder openable at both ends and long removable closures for said open ends, the combination of outer, inner and intermediate co-axial stirring elements in said freezing cylinder, a driving means for said stirring means adjacent the one end of said cylinder, a stud shaft on said intermediate element keyed to a stationary displacement and supporting spider keyed to the end of said cylinder opposite the end adjacent said driving means, an annular bearing rotatably mounted on said stud shaft and engaging the front end of said outer stirring element to support the same, a single detent means for retaining said annular bearing in engagement with said outer stirring element and for holding the intermediate element within the outer element, an inner pivot in the rear portion of said outer element for rotatably supporting the adjacent end of said intermediate element, a central bearing element having clutching faces and positioned in the rear portion of said outer element for supporting and drivingly engaging the corresponding end of said inner element, and a central pintle on the interior of the front end of said intermediate element for rotatably supporting the corresponding end of said inner element.

10. An agitator for a processing chamber of an ice cream freezer comprising, in combination, a rotatable agitator and scraping blade support comprising a cage-like structure within said chamber, and a scraping blade carried by said support for scraping material from the inner periphery of said processing chamber and directing it into said cage-like agitator, said blade being provided with a serrated rear edge having some serrated portions inclined inwardly toward the agitator for directing scraped material toward the central portion of the processing chamber.

11. An agitator for an ice cream freezer comprising inner, outer and intermediate separable agitator members, a driving shaft and supporting element for the one end of said outer member, bearing means supporting the other end of said outer member upon the complementary end of the intermediate member, means for rotatably supporting the opposite end of said intermediate member within said outer member, means supporting the adjacent end of the inner member within said one end of said outer member, means drivingly connecting the inner and outer members, means for rotatably supporting the remaining end of said inner member within said intermediate member, and readily detachable retaining means for maintaining said inner, outer and intermediate members in operative relation one to another whereby, upon detaching said retaining means, said intermediate member and said inner member may be removed from said outer member and said inner member removed from said intermediate member.

12. An agitator for an ice cream freezer or the like comprising, in combination, an outer cage-like supporting body, a scraping blade pivotally supported upon said supporting body, a rigid inner agitator element, and an intermediate agitator element, at least one of said elements comprising a cage-like structure, said elements being so constructed and arranged that said intermediate element is relatively rotatable with respect to said outer cage-like supporting body and said inner agitator element, said outer cage-like supporting body and said intermediate agitator element being of substantially equal length, said inner and intermediate agitator elements being imprisoned within said outer cage-like supporting body.

13. In a dasher for a processing cylinder, a whipping and scraping unit comprising an outer rotatable cage-like carrier element, scraping blades carried by said carrier element adjacent the wall of the processing cylinder to scrape the same, an inner whipping member rotatable in concurrent direction with said carrier element, and a stationary cage-like whipping member imprisoned within said carrier element intermediate said carrier element and said inner whipping member by means forming part of said carrier element releasably secured to the remainder of said carrier element.

14. In an agitator for an ice cream freezer having a cylindrical processing chamber, a first series of longitudinally extending whipping rods radially disposed from the axis of the chamber to form a cage-like structure, and a second series of longitudinally extending whipping rods radially disposed from the axis of the chamber to form a cage-like structure and supported for rotation within the first series of whipping rods independent of the rotation of said first series of whipping rods, said second series of whipping rods being imprisoned within said first series of whipping rods by means at the ends of said first series of whipping rods disposed radially from the axis of said chamber a distance sufficient to imprison said second series of whipping rods.

15. In an agitator for an ice cream freezer having a freezing cylinder, a material agitating device extending longitudinally within the freezing cylinder and comprising inner and outer unidirectionally rotatable members, a stationary agitator member intermediate said inner and outer rotatable members and imprisoned within said outer rotatable member by end closures for the outer rotatable member, and a single driving element extending out of said freezing cylinder for the operation of said agitator members.

16. An agitator for use in a material processing device comprising, in combination, a rotatable substantially cylindrical hollow body having an aperture for the passage of materials through a substantially cylindrical wall thereof, a scraping blade tiltably keyed to said body in position to overlie said aperture, and means on said scraping blade inclined to the plane of said scraping blade and extending into said aperture.

17. In a device of the class described, a rotatable cage-like carrier element, scraping blades carried on said element, and a multi-surfaced stationary agitator element imprisoned within said rotatable cage-like element by means releasably secured to said cage-like element.

18. In a device of the class described, a substantially enclosed rotatable outer member for a processing agitator, openings in the wall of said substantially enclosed rotatable member, a scraping blade carried by said member and disposed over an opening in the wall of said substantially enclosed rotatable outer member, and a multi-surfaced stationary agitator imprisoned within said rotatable member by means releasably secured to said substantially enclosed rotatable outer member.

CHARLES F. WEINREICH.
ALBERT L. VOGGENTHALER.